US011661027B1

(12) United States Patent
Deng et al.

(10) Patent No.: US 11,661,027 B1
(45) Date of Patent: May 30, 2023

(54) AIRBAG AND METHOD OF MANUFACTURE

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/675,014

(22) Filed: Feb. 18, 2022

(51) Int. Cl.
*B60R 21/235* (2006.01)
*B60R 21/231* (2011.01)

(52) U.S. Cl.
CPC ...... *B60R 21/235* (2013.01); *B60R 21/23138* (2013.01); *B60R 2021/23146* (2013.01); *B60R 2021/23538* (2013.01)

(58) Field of Classification Search
None
See application file for complete search history.

(56) References Cited

U.S. PATENT DOCUMENTS

| | | | | |
|---|---|---|---|---|
| 5,114,180 A | * | 5/1992 | Kami | B60R 21/235 280/739 |
| 5,536,038 A | * | 7/1996 | Bollaert | B60R 21/239 280/739 |
| 5,865,464 A | * | 2/1999 | Kanuma | B60R 21/235 280/743.1 |
| 8,882,143 B2 | | 11/2014 | Williams et al. | |
| 9,327,673 B2 | * | 5/2016 | Fukawatase | B60R 21/23138 |
| 9,457,759 B2 | | 10/2016 | Sugimoto et al. | |
| 9,834,168 B2 | * | 12/2017 | Deng | B60R 21/23138 |
| 2008/0106128 A1 | | 5/2008 | Kashiwagi | |

FOREIGN PATENT DOCUMENTS

| | | | |
|---|---|---|---|
| FR | 2724144 A1 * | 3/1996 | ............. B60R 21/23 |
| JP | 2020050138 A | 4/2020 | |

* cited by examiner

*Primary Examiner* — Faye M Fleming
(74) *Attorney, Agent, or Firm* — Frank A. MacKenzie; Bejin Bieneman PLC (57) ABSTRACT

A method of manufacturing an airbag includes fixing a first reinforcement panel to a first main panel at a first edge of the first main panel. The method includes fixing a second reinforcement panel to a second main panel at a second edge of the second main panel. The method includes overlaying the first main panel on the second main panel with the first reinforcement panel aligned with the second reinforcement panel and the first edge aligned with the second edge. The method includes fixing the first main panel to the second main panel along the first edge and the second edge. The method includes creating a vent by cutting both the first reinforcement panel and the second reinforcement panel along a cut line to form the vent.

19 Claims, 7 Drawing Sheets

FIG. 7

AIRBAG AND METHOD OF MANUFACTURE

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

A method of manufacturing an airbag includes fixing a first reinforcement panel to a first main panel at a first edge of the first main panel. The method includes fixing a second reinforcement panel to a second main panel at a second edge of the second main panel. The method includes overlaying the first main panel on the second main panel with the first reinforcement panel aligned with the second reinforcement panel and the first edge aligned with the second edge. The method includes fixing the first main panel to the second main panel along the first edge and the second edge. The method includes creating a vent by cutting both the first reinforcement panel and the second reinforcement panel along a cut line to form the vent.

The first main panel may be fixed to the second main panel with a stitching extending continuously along the first edge and the second edge from above the first reinforcement panel and the second reinforcement panel to below the first reinforcement panel and the second reinforcement panel.

The cut line may intersect the stitching.

The method may include fixing the first reinforcement panel to the first main panel along a first line and a second line.

The first reinforcement panel maybe fixed to the first main panel along the first line with a first stitching and along the second line with a second stitching.

The first main panel may be fixed to the second main panel with a third stitching that intersects the first stitching and the second stitching.

The first line may extend arcuately from a first end to a second end.

The first line may be spaced from the second line.

The first line may be between the second line and the first edge.

The method may include, before cutting along the cut line, selecting a location for the cut line as either between the first line and the second line or between the first line and the first edge.

The method may include identifying a stiffness for the airbag and selecting the location for the cut line based on the identified stiffness.

The vent may be created after the first main panel is fixed to the second main panel.

The method may include cutting the first reinforcement panel and the second reinforcement panel along the cut line with a laser.

The method may include cutting the first reinforcement panel and the second reinforcement panel along the cut line with a blade.

An airbag includes a first main panel having a first edge. The airbag includes a first reinforcement panel at the first edge and fixed to the first main panel along a first inner stitch line and a first outer stitch line spaced from the first inner stitch line. The airbag includes a second main panel having a second edge aligned with the first edge. The airbag includes a second reinforcement panel at the second edge and fixed to the second main panel along a second inner stitch line and a second outer stitch line spaced from the second inner stitch line. The first main panel is fixed the second main panel along the first edge of the first main panel and the second edge the second main panel from above the first inner stitch line and the first outer stitch line to below the first inner stitch line and the first outer stitch line.

The first inner stitch line and the first outer stitch line may each extend arcuately from a first end to a second end.

The first end and the second end of the first outer stitch line may abut the first edge of the first main panel.

The second inner stitch line and the second outer stitch line may each extend arcuately from a third end to a fourth end.

The third end and the fourth end of the second inner stitch line and the second outer stitch may each abuts the second edge of the second main panel.

With reference to the Figures, wherein like numerals indicate like parts throughout the several views, a method of manufacturing an airbag 20 includes fixing a first reinforcement panel 22 to a first main panel 24 at a first edge 26 of the first main panel 24. The method includes fixing a second reinforcement panel 28 to a second main panel 30 at a second edge 32 of the second main panel 30. The method includes overlaying the first main panel 24 on the second main panel 30 with the first reinforcement panel 22 aligned with the second reinforcement panel 28 and the first edge 26 aligned with the second edge 32. The method includes fixing the first main panel 24 to the second main panel 30 along the first edge 26 and the second edge 32. The method includes creating a vent 34 by cutting both the first reinforcement panel 22 and the second reinforcement panel 28 along a cut line, e.g., a first cut line 36 or a second cut line 38, to form the vent 34.

Creating the vent 34 by cutting both the first reinforcement panel 22 and the second reinforcement panel 28, e.g., after the first main panel 24 is fixed to the second main panel 30, enables a size of an opening of the vent 34 to be determined after that airbag 20 is formed, e.g., sans the vent 34. For example, numerous airbags 20 without vents 34 may be first be manufactured, and the vents 34 may be latter created, e.g., at various sizes depending on demand and application, thereby providing flexibility in the supply chain of the airbags 20.

Figure 1:
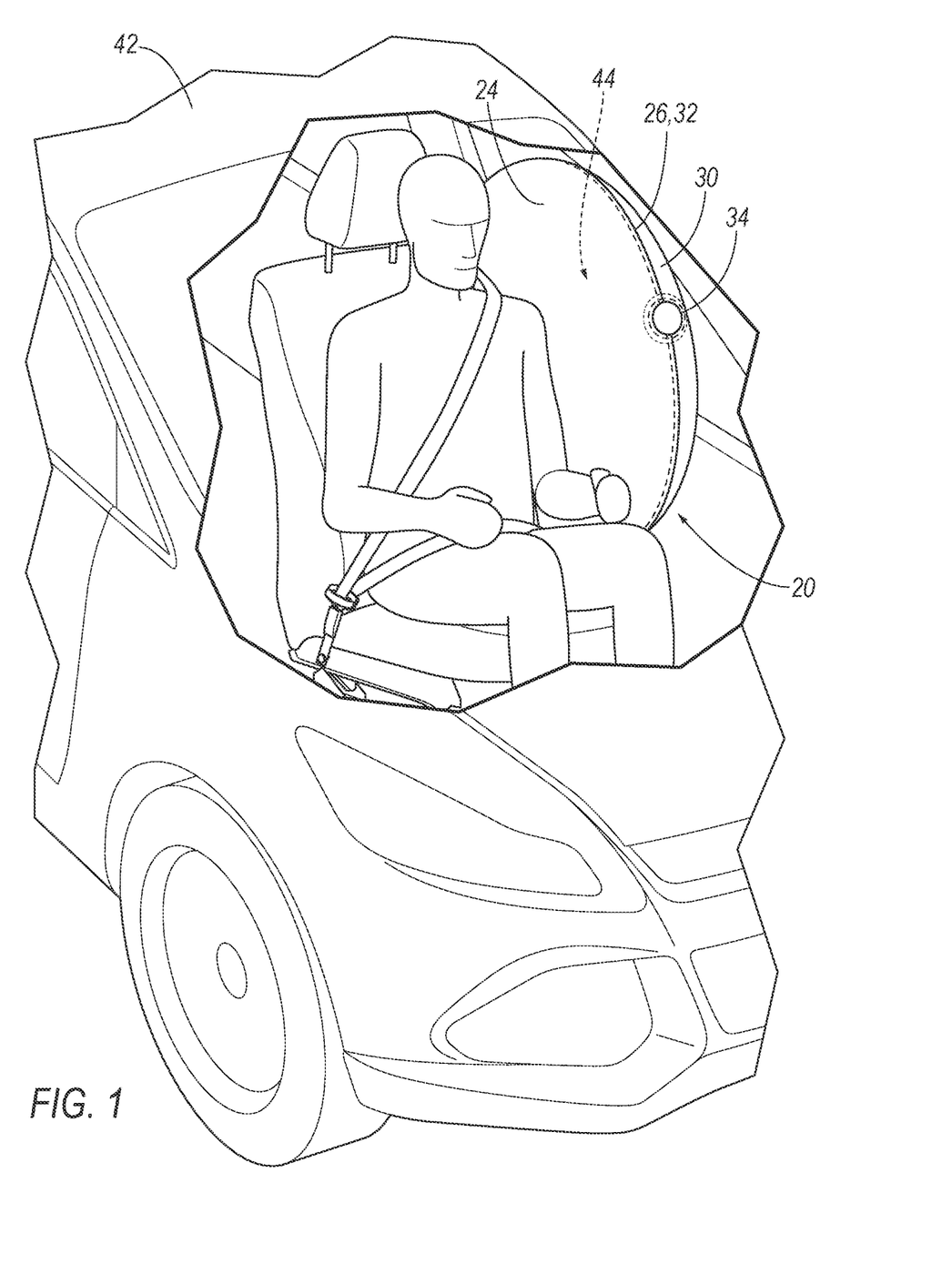
FIG. 1 is a perspective view of a vehicle passenger cabin with airbag in the inflated position.

Turning to FIG. 1, a vehicle 42 with the airbag 20 in the inflated position is shown. The airbag 20 is shown at a side of a passenger cabin supported by a seat of the vehicle 42, e.g., to control lateral kinematics of an occupant in the seat of the vehicle 42. The airbag 20 in the inflated position is shown having a generally circular shape. The airbag 20 may be at any other suitable position on the vehicle 42, e.g., supported by an instrument panel, center console, pillar, roof, etc. The airbag 20 in the inflated position may have any suitable shape, e.g., rectangular, cylindrical, etc.

The airbag 20, e.g., the first main panel 24, the second main panel 30, the first reinforcement panel 22, and the second reinforcement panel 28, may be fabric, e.g., a woven polymer. As an example, the airbag 20 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

Figure 2:
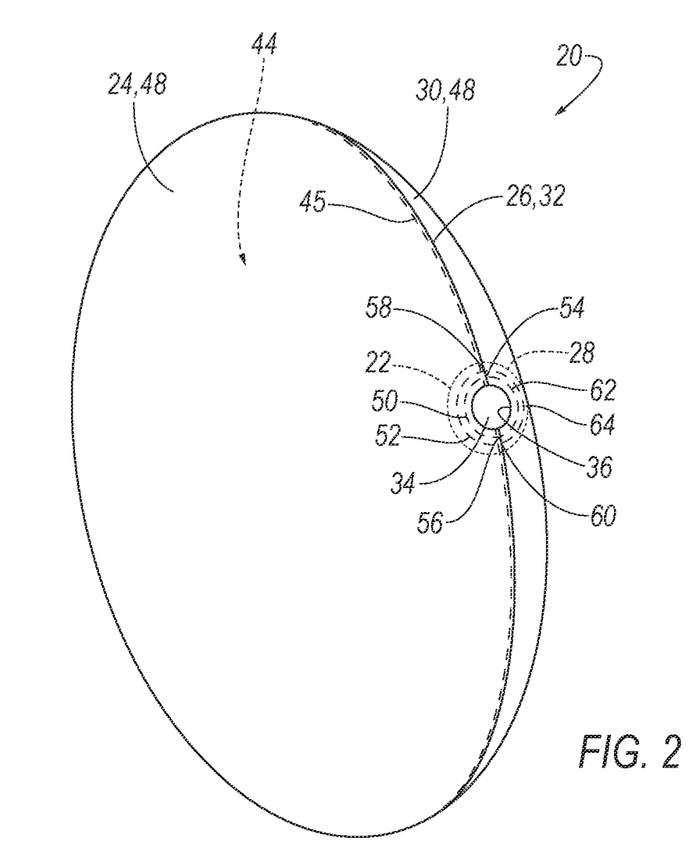
FIG. 2 is a perspective view of the airbag in the inflated position and a vent created by cutting along a first cut line.
Figure 3:
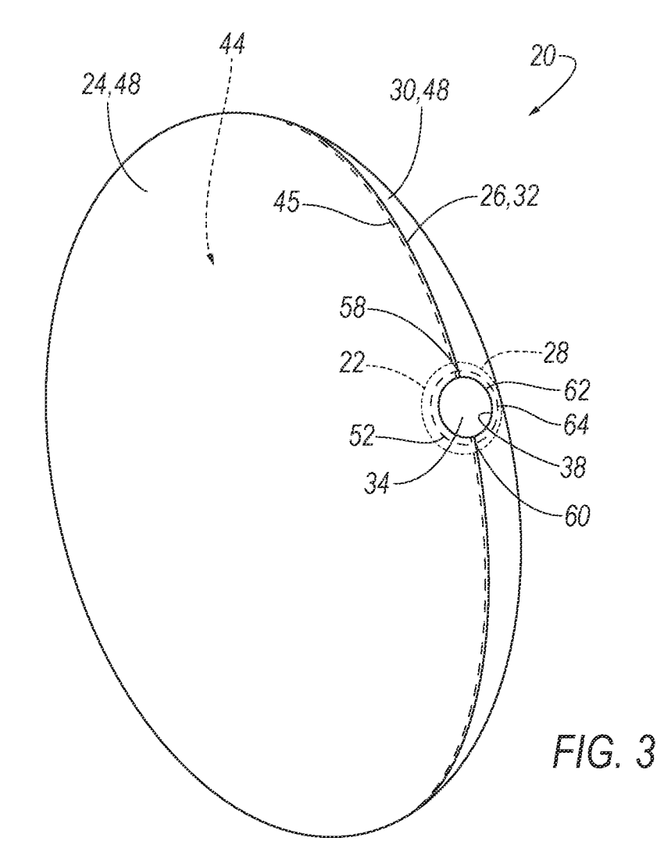
FIG. 3 is a perspective view of the airbag in the inflated position and a vent created by cutting along a second cut line.
Figure 5:
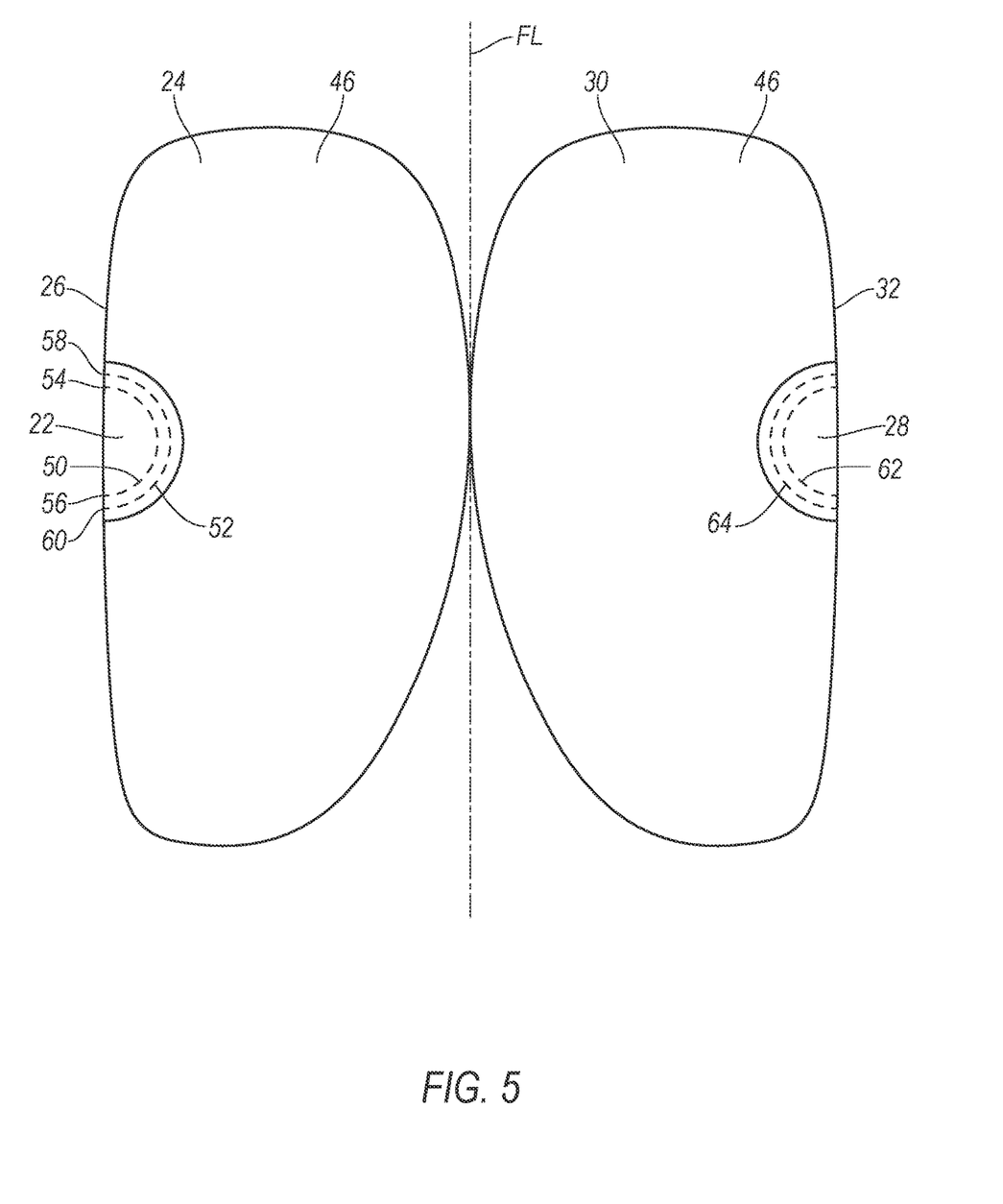
FIG. 5 is a top view of a first reinforcement panel fixed to a first main panel and a second reinforcement panel fixed to a second main panel.
Figure 6:
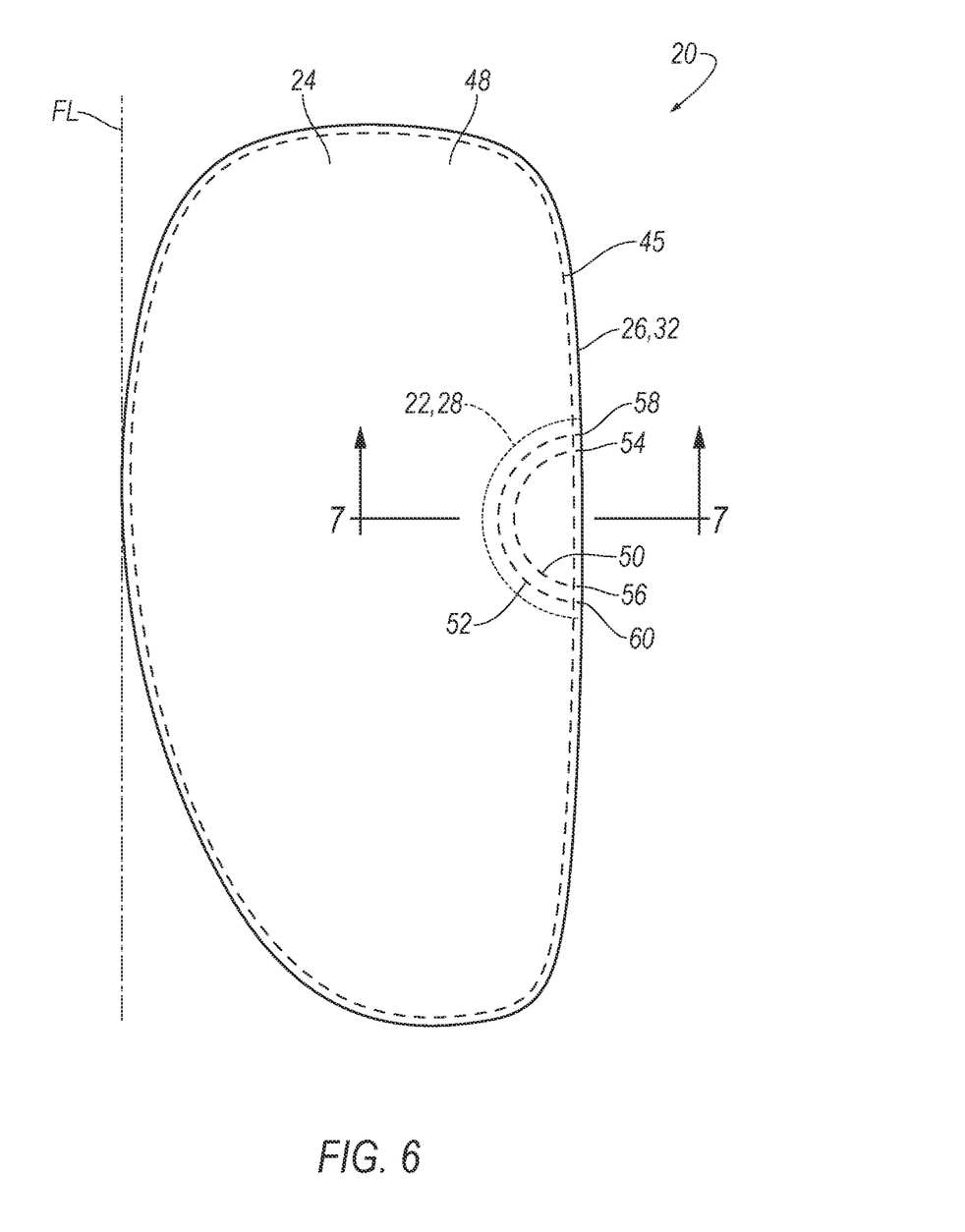
FIG. 6 is a top view of the first main panel overlaid on, and fixed to, the second main panel.
Figure 7:
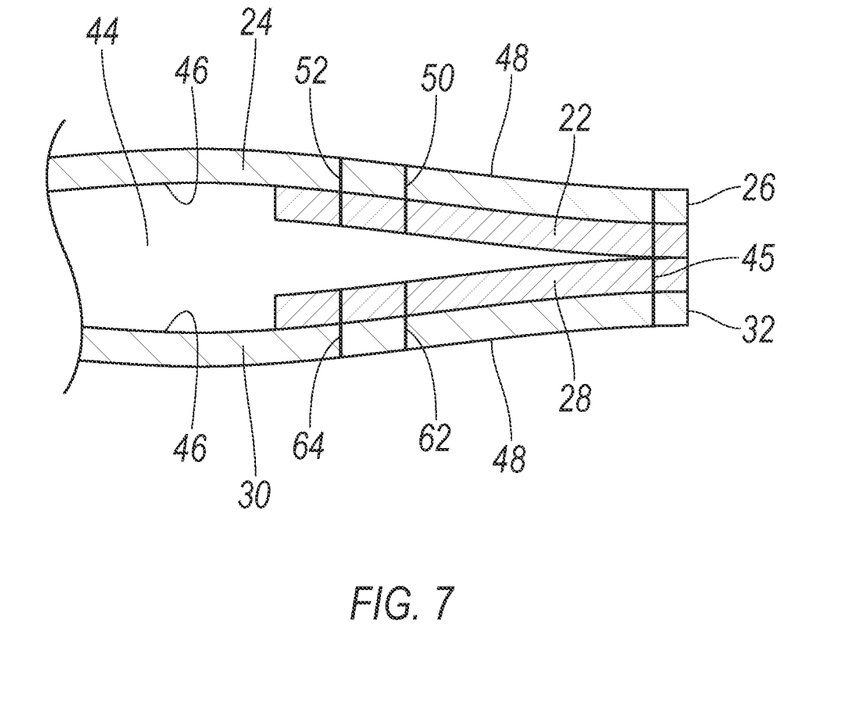
FIG. 7 is a cross-section view along a line 7-7 of FIG. 6.
Figure 8:
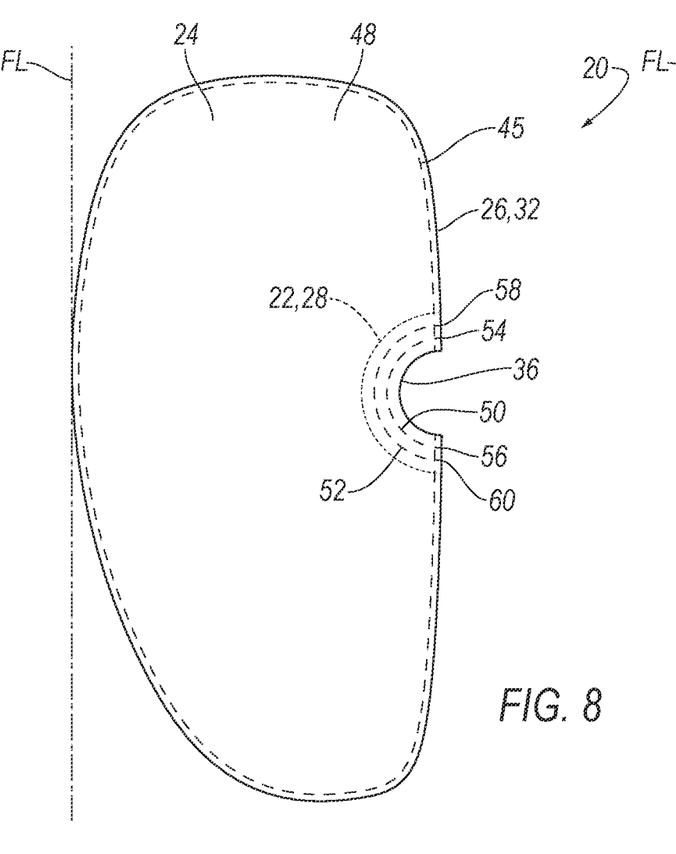
FIG. 8 is a top view of the first main panel, the first reinforcement panel, the second main panel, and the second reinforcement panel cut along the first cut line.

Turning to FIGS. 1 to 3, the first main panel 24 and the second main panel 30 enclose an inflation chamber 44 of the airbag 20. The first edge 26 of the first main panel 24 is aligned with the second edge 32 of the second main panel 30. The first edge 26 of the first main panel 24 is fixed to the second edge 32 of the second main panel 30. For example, a stitching 45 may fix the first edge 26 to the second edge 32. The stitching 45 may extend continuously from above to below the first reinforcement panel 22 and the second reinforcement panel 28 prior to creation of the vent 34, as shown in FIG. 6. In other words, the stitching 45 may be longer than the first reinforcement panel 22 and the second reinforcement panel 28 along the first edge 26 and the second edge 32, with the first reinforcement panel 22 and the second reinforcement panel 28 spaced from and between opposing distal ends of the stitching 45. As another example, the first edge 26 may be, additionally or alternatively, fixed to the second edge 32 with friction weld, adhesive, etc. After the vent 34 is created, as shown in FIGS. 1-3, 8, and 9, the stitching 45 may be bifurcated and extend upward from the vent 34 to beyond the first reinforcement panel 22 and the second reinforcement panel 28 and downward from the vent 34 to beyond the first reinforcement panel 22 and the second reinforcement panel 28. The first main panel 24 may be fixed to the second main panel 30 about a perimeter of the airbag 20. For example, the stitching 45 may extend along the perimeter in whole or in part. The first main panel 24 and the second main panel 30 may be unitary. Unitary means a single, uniform piece of material with no seams, joints, fasteners, or adhesives holding it together, i.e., formed together simultaneously as a single continuous unit, e.g., by cutting from a single sheet of woven fabric, etc. Non-unitary components, in contrast, are formed completely separately and subsequently assembled, e.g., by stitching, friction welding, etc. For example, the first main panel 24 and the second main panel 30 may be formed from a common sheet of fabric that is folded along a fold line at the perimeter of the airbag 20, e.g., as shown in FIGS. 5 and 6. The airbag 20 may include one or more other panels that enclose the inflation chamber 44.

The first reinforcement panel 22 and the second reinforcement panel 28 provide additional strength to the first main panel 24 and the second main panel 30 at the vent 34. The first reinforcement panel 22 is at the first edge 26 of the first main panel 24 and extends along the first main panel 24 away from the second main panel 30. The second reinforcement panel 28 is at the second edge 32 of the second main panel 30 and extends along the second main panel 30 away from the first main panel 24. The first reinforcement panel 22 and the second reinforcement panel 28 may be on an inner surface 46 of the first main panel 24 and the second main panel 30, e.g., within the inflation chamber 44. The first reinforcement panel 22 and the second reinforcement panel 28 may be on an outer surface 48 of the first main panel 24 and the second main panel 30, e.g., outside the inflation chamber 44 (not shown).

The first reinforcement panel 22 is fixed to the first main panel 24, e.g., via stitching, friction welding, adhesive, etc. The first reinforcement panel 22 may fixed to the first main panel 24 with stitching along a first inner stitch line 50 and a first outer stitch line 52. The first inner stitch line 50 and the first outer stitch line 52 provide additional strength to the airbag 20 at the vent 34. The first outer stitch line 52 may be spaced from the first inner stitch line 50, e.g., along the first reinforcement panel 22. The first outer stitch line 52 may be between the first outer stitch line 52 and the first edge 26. The first inner stitch line 50 may extend arcuately from a first inner end 54 to a second inner end 56. The first outer stitch line 52 may extend arcuately from a first outer end 58 to a second outer end 60. For example, the first inner stitch line 50 and the first outer stitch line 52 may each have a half circle shape. The first inner stitch line 50 and the first outer stitch line 52 may abut the first edge 26. For example, the first inner end 54 and the first outer end 58 may abut the first edge 26 above the vent 34. The second inner end 56 and the second outer end 60 may abut the first edge 26 below the vent 34. The stitch lines may be any other suitable shape or configuration.

The second reinforcement panel 28 is fixed to the second main panel 30, e.g., via stitching, friction welding, adhesive, etc. For example, the second reinforcement panel 28 may fixed to the second main panel 30 with stitching along a second inner stitch line 62 and a second outer stitch line 64. The second outer stitch line 64 may be spaced from the second inner stitch line 62, the second outer stitch line 64 and the second inner stitch line 62 may extend arcuately from one end to another end, the second outer stitch line 64 and the second inner stitch line 62 may abut the second edge 32, etc., and, e.g., as described for the first inner stitch line 50 and the first outer stitch line 52. The first inner stitch line 50 and the second inner stitch line 62 may collectively form a first circle surrounding the vent 34, as shown in FIG. 3. The first outer stitch line 52 and the first outer stitch line 52 may collectively form a second circle surrounding and the vent 34, as shown FIGS. 2 and 3. The first circle and the second circle may be concentric.

The first main panel 24, the second main panel 30, the first reinforcement panel 22, and the second reinforcement panel 28 may be fixed to each other, e.g., along the first edge 26 of the first main panel 24 and the second edge 32 the second main panel 30 from above the first outer stitch line 52 and the second outer stitch line 64 to below the first outer stitch line 52 and second outer stitch line 64. The stitching 45 along the first edge 26 and the second edge 32 may intersect the first inner stitch line 50 and the first outer stitch line 52, e.g., at the first inner end 54, the first outer end 58, the second inner end 56 and the second outer end 60. The stitching 45 along the first edge 26 and the second edge 32 may intersect the second inner stitch line 62 and the second outer stitch line 64.

The airbag 20 includes the vent 34. The vent 34 permits air flow out of the inflation chamber 44. The vent 34 defines the opening. A size of the opening controls a stiffness of the airbag 20 in the inflated position, e.g., by controlling a flow rate of air out of the inflation camber 44 of the airbag 20. A relatively larger size of the opening provides a relatively lower firmness to the airbag 20, and a relatively smaller size of the opening provides a relatively higher firmness to the airbag 20.

Figure 9:
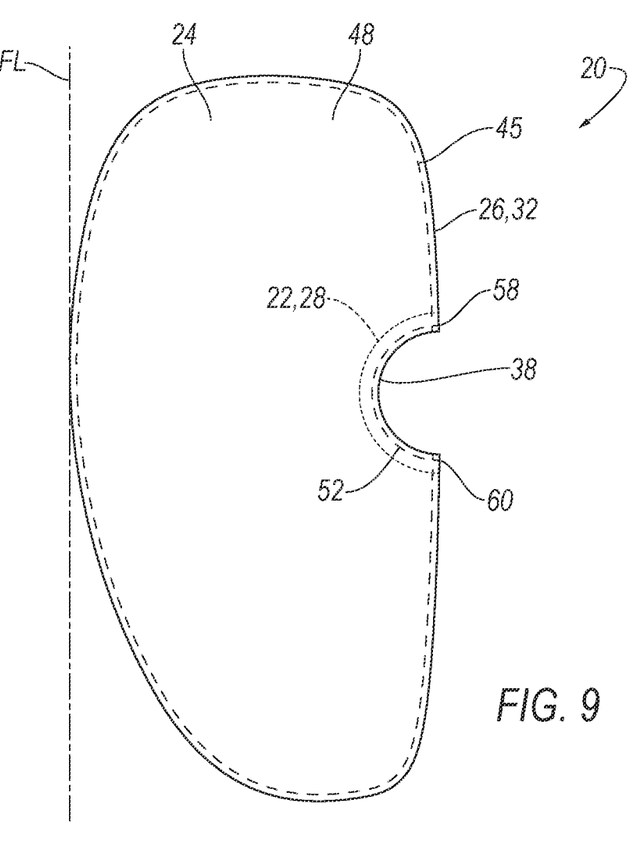
FIG. 9 is a top view of the first main panel, the first reinforcement panel, the second main panel, and the second reinforcement panel cut along the second cut line.

The opening of the vent 34 maybe created by cutting the first main panel 24, the second main panel 30, the first reinforcement panel 22, and the second reinforcement panel 28, e.g., along the first cut line 36 (shown in FIGS. 2 and 8) or the second cut line 38 (shown in FIGS. 3 and 9). The first cut line 36 may be between the first inner stitch line 50 and the first edge 26. The second cut line 38 may be between the first inner stitch line 50 and the first outer stitch line 52. The first cut line 36 and the second cut line 38 may be arcuate. The first cut line 36 and the second cut line 38 may intersect the stitching 45 that is along the first edge 26. The first cut line 36 and the second cut line 38 may abut the first edge 26 and the second edge 32. For example, the first cut line 36 and the second cut line 38 may each have a half circle shape with ends abutting the first edge 26 and the second edge 32, the half circle extending beyond the stitching 45. The first cut line 36 and the second cut line 38 control the size of the opening of the vent 34. For example, the opening is smaller when created by cutting along the first cut line 36 and larger when created by cutting along the second cut line 38.

Figure 4:
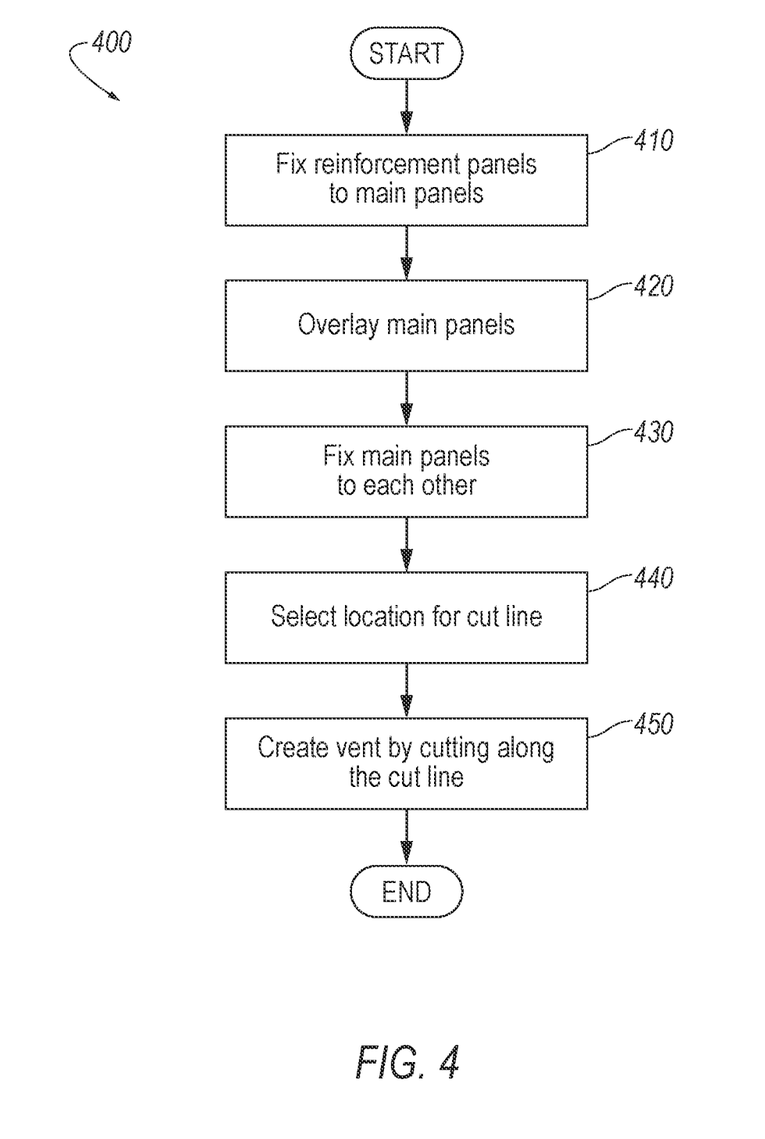
FIG. 4 is a flow chart illustrating a process for manufacturing the airbag.

With reference to FIG. 4, a process 400 for manufacturing the airbag 20 is shown. The process 400 begins at a step 410. Before the process 400 begins, the first main panel 24, the first reinforcement panel 22, the second main panel 30, and the second reinforcement panel 28 are obtained. For example, the first main panel 24, the first reinforcement panel 22, the second main panel 30, and the second reinforcement panel 28 may be cut from a suitable fabric. In the example shown in FIG. 5, the first main panel 24 and the second main panel 30 are unitary. Alternately, the first main panel 24 and the second main panel 30 may be separate from each other.

At the step 410 the first reinforcement panel 22 is fixed to the first main panel 24 at the first edge 26 of the first main panel 24. The first reinforcement panel 22 may be fixed to the first main panel 24 along a first line and a second line. For example and as shown in FIG. 5, stitching may be sewn along the first inner stitch line 50 and the first outer stitch line 52 to fix the first reinforcement panel 22 to the first main panel 24. Additionally, the second reinforcement panel 28 is fixed to the second main panel 30 at the second edge 32 of the second main panel 30. For example, stitching may be sewn along the second inner stitch line 62 and the second outer stitch line 64 to fix the second reinforcement panel 28 to the second main panel 30.

Next, at a step 420 the first main panel 24 is overlaid on the second main panel 30 with the first reinforcement panel 22 aligned with the second reinforcement panel 28 and the first edge 26 aligned with the second edge 32. In other words, the first main panel 24 may be placed on top of the second main panel 30 with the first reinforcement panel 22 directly over the second reinforcement panel 28 and the first edge 26 directly over the second edge 32. In the example shown in FIGS. 5 and 6, the unitary first main panel 24 and second main panel 30 is folded along the fold line FL to overlay the first main panel 24 on the second main panel 30.

Next, at a step 430 the first main panel 24 is fixed to the second main panel 30 along the first edge 26 and the second edge 32, e.g., with the stitching 45. The stitching 45 may be sewn in a single continuous operation, e.g., extending continuously along the first edge 26 and the second edge 32 from above the first reinforcement panel 22 and the second reinforcement panel 28 to below the first reinforcement panel 22 and the second reinforcement panel 28 and around a perimeter of the first main panel 24, as shown in FIG. 6. The stitching 45 may intersect the first inner stitch line 50, the first outer stitch line 52, the second inner stitch line 62, and the second outer stitch line 64. The stitching 45 may fix the first reinforcement panel 22, the first main panel 24, the second reinforcement panel 28, and the second main panel 30 to each other.

After the first main panel 24 is fixed to the second main panel 30, the vent 34 is created. The vent 34 may be created by selecting a location for a cut line, and then cutting along the cutline, as described below.

At a step 440, the location for the cut line is selected. The location for the cutline may be either between the first inner stitch line 50 and the first outer stitch line 52 or between the first inner stitch line 50 and the first edge 26. In other words, the first cut line 36 or the second cut line 38 may be selected. Selecting the location for the cut line may be based on a stiffness for the airbag 20. The stiffness for the airbag 20 may be identified, for example, though empirical and computer based crash testing that indicates how various airbag 20 stiffnesses effect kinematic control of the occupant in different applications of the airbag 20, e.g., in different vehicle models, different vehicle locations, etc.

At a step 450, the vent 34 is created by cutting the first main panel 24, the first reinforcement panel 22, the second main panel 30, and the second reinforcement panel 28 along the cut line selected at the step 440. The first main panel 24, the first reinforcement panel 22, the second main panel 30, and the second reinforcement panel 28 may be cut with a blade, a laser, a water knife, etc., e.g., moved by a CNC machine, robotic arm, plotter, or other suitable structure. The blade may be sufficiently sharp to slice the fabric of the first main panel 24, the first reinforcement panel 22, the second main panel 30, and the second reinforcement panel 28 along the selected cut line. The laser may be of sufficient intensity to burn through first main panel 24, the first reinforcement panel 22, the second main panel 30, and the second reinforcement panel 28 along the selected cut line.

The adjectives first and second are used throughout this document as identifiers and, unless explicitly stated otherwise, are not intended to signify importance, order, or quantity.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of manufacturing an airbag, comprising:
fixing a first reinforcement panel to a first main panel at a first edge of the first main panel;
fixing a second reinforcement panel to a second main panel at a second edge of the second main panel;
overlaying the first main panel on the second main panel with the first reinforcement panel aligned with the second reinforcement panel and the first edge aligned with the second edge;
fixing the first main panel to the second main panel along the first edge and the second edge; and
after fixing the first main panel to the second main panel, creating a vent by cutting both the first reinforcement panel and the second reinforcement panel along a cut line to form the vent.

2. The method of claim 1, wherein the first main panel is fixed to the second main panel with a stitching extending continuously along the first edge and the second edge from above the first reinforcement panel and the second reinforcement panel to below the first reinforcement panel and the second reinforcement panel.

3. The method of claim 2, wherein the cut line intersects the stitching.

4. The method of claim 1, further comprising fixing the first reinforcement panel to the first main panel along a first line and a second line.

5. The method of claim 4, wherein the first reinforcement panel is fixed to the first main panel along the first line with a first stitching and along the second line with a second stitching.

6. The method of claim 5, wherein the first main panel is fixed to the second main panel with a third stitching that intersects the first stitching and the second stitching.

7. The method of claim 4, wherein the first line extends arcuately from a first end to a second end.

8. The method of claim 4, wherein the first line is spaced from the second line.

9. The method of claim 8, wherein the first line is between the second line and the first edge.

10. The method of claim 9, further comprising, before cutting along the cut line, selecting a location for the cut line as either between the first line and the second line or between the first line and the first edge.

11. The method of claim 10, further comprising identifying a stiffness for the airbag and selecting the location for the cut line based on the identified stiffness.

12. The method of claim 1, further comprising cutting the first reinforcement panel and the second reinforcement panel along the cut line with a laser.

13. The method of claim 1, further comprising cutting the first reinforcement panel and the second reinforcement panel along the cut line with a blade.

14. An airbag, comprising:
a first main panel having a first edge;
a first reinforcement panel at the first edge and fixed to the first main panel along a first inner stitch line and a first outer stitch line spaced from the first inner stitch line;
a second main panel separate from the first reinforcement panel, the second main panel having a second edge aligned with the first edge;
a second reinforcement panel separate from the first main panel, the second reinforcement panel at the second edge and fixed to the second main panel along a second inner stitch line and a second outer stitch line spaced from the second inner stitch line; and
the first main panel fixed to the second main panel along the first edge of the first main panel and the second edge the second main panel from above the first inner stitch line and the first outer stitch line to below the first inner stitch line and the first outer stitch line.

15. The airbag of claim 14, wherein the first inner stitch line and the first outer stitch line each extend arcuately from a first end to a second end.

16. The airbag of claim 15, wherein the first end and the second end of the first outer stitch line abut the first edge of the first main panel.

17. The airbag of claim 16, wherein the second inner stitch line and the second outer stitch line each extend arcuately from a third end to a fourth end.

18. The airbag of claim 17, wherein the third end and the fourth end of the second inner stitch line and the second outer stitch line each abuts the second edge of the second main panel.

19. The airbag of claim 15, wherein the first main panel and the second main panel enclose an inflation chamber, and the first reinforcement panel and the second reinforcement panel are both in the inflation chamber.

* * * * *